US007465043B2

(12) United States Patent
Sueoka

(10) Patent No.: US 7,465,043 B2
(45) Date of Patent: Dec. 16, 2008

(54) LIQUID DISTRIBUTION UNIT, INK-JET RECORDING APPARATUS AND IMAGE FORMING APPARATUS

(75) Inventor: Hideki Sueoka, Tokyo (JP)

(73) Assignee: Ricoh Company, Ltd, Tokyo (JP)

( * ) Notice: Subject to any disclaimer, the term of this patent is extended or adjusted under 35 U.S.C. 154(b) by 418 days.

(21) Appl. No.: 11/302,679

(22) Filed: Dec. 14, 2005

(65) Prior Publication Data

US 2006/0132559 A1 Jun. 22, 2006

(30) Foreign Application Priority Data

Dec. 17, 2004 (JP) ............................ 2004-365325

(51) Int. Cl.
*B41J 2/175* (2006.01)
*B41J 2/17* (2006.01)
*F16K 1/00* (2006.01)
*F17D 1/00* (2006.01)
*B65B 1/04* (2006.01)

(52) U.S. Cl. .......................... 347/85; 347/84; 137/883; 137/263; 137/266; 141/244

(58) Field of Classification Search .................. 347/85, 347/84, 86, 30, 28; 222/134; 137/15.09, 137/263, 266, 265, 883, 884; 141/181, 236, 141/244
See application file for complete search history.

(56) References Cited

U.S. PATENT DOCUMENTS 4,323,907 A * 4/1982 Italiano ....................... 347/85
5,611,462 A * 3/1997 Barkes ....................... 222/134
5,900,890 A * 5/1999 Mitchell ....................... 347/28
6,193,356 B1 * 2/2001 Takata ......................... 347/30
6,281,916 B1 * 8/2001 VanSteenkiste .............. 347/85
6,460,568 B1 * 10/2002 Goodwin ................ 137/561 A
6,467,887 B2 * 10/2002 Lopez et al. .................. 347/68
6,964,473 B2 * 11/2005 Martin ........................ 347/85
7,021,671 B2 * 4/2006 Evans ...................... 285/125.1
7,168,798 B2 * 1/2007 Samii et al. ................... 347/86
7,213,618 B2 * 5/2007 Milburn et al. .............. 137/884
2005/0005349 A1 * 1/2005 Gardenier .................. 4/541.1

FOREIGN PATENT DOCUMENTS

JP 5-8400 1/1993
JP 2000-141687 5/2000
JP 2001-304131 10/2001
JP 2001-315349 11/2001
JP 2002-307707 10/2002
JP 2003-84552 3/2003

* cited by examiner

*Primary Examiner*—Stephen D Meier
*Assistant Examiner*—Rene Garcia, Jr.
(74) *Attorney, Agent, or Firm*—Cooper & Dunham LLP

(57) ABSTRACT

A liquid distribution unit for use between a container of a liquid and an apparatus supplied with said liquid, said liquid distribution unit includes a hollow body, a single inlet port provided in the hollow body for connection to the container, the hollow body being supplied with the liquid from the container via the single inlet port, and two or more outlet ports provided in the hollow body for feeding the liquid out from the hollow body.

10 Claims, 11 Drawing Sheets

LIQUID DISTRIBUTION UNIT, INK-JET RECORDING APPARATUS AND IMAGE FORMING APPARATUS

BACKGROUND

This disclosure relates to a liquid distribution unit provided between a container accommodating therein a liquid and a device or apparatus that receives and used the liquid. Further, this disclosure relates to apparatuses such as an ink-jet recording apparatus, image forming apparatus, or the like, that uses such a liquid distribution unit for distributing an ink. For example, this disclosure relates to a liquid distribution unit for use in an image forming apparatus such as copiers, printers, facsimile apparatuses and multifunctional apparatuses for distribution an ink to recording heads.

Conventionally, various ink-supplying means are proposed and put into practice in the field of ink-jet recording apparatuses that conducts printing on a recording sheet such as paper by ejecting ink droplets from a nozzle.

Particularly, there is used a construction of confining an ink in a bag of flexible material and taking out the ink by inserting a needle to the bag. The ink thus taken out is transported to a recording head.

In such a construction, the ink bag is mounted in a recording apparatus at a fixed position in the form of an ink cartridge, wherein the ink bag is typically accommodated in a hard resin case, and the ink is supplied to movable recording head mounted movably upon a carriage by way of a flexible tube, or the like. With such a construction, it becomes possible to avoid using large power motor for driving the carriage that carries the recording head and also the heavy ink tank.

Because of its capability of performing high-density recording by forming minute dots, the recording apparatus of this type is used extensively in versatile printing applications including color printing, while there is recently a demand of further high-quality output, and thus, there is a demand for further improvement of printing quality for both color printing and monochromatic printing, which uses a black ink.

In order to meet for such a demand and to perform the monochromatic printing with high definition, there is proposed a technology of using two or more recording heads for the black color ink and supply the inks of the same black color to the respective recording heads. Thereby, the precision of printing is improved by displacing the printing position between these plural recording heads for the black color.

However, such a construction requires feeding of the inks of the same color to plural recording heads, and the user of the recording apparatus has to purchase plural ink cartridges of the same color, while such use of plural ink cartridges of the same color increases the running cost of the image forming apparatus and increases the chance of confusion caused in the side of the user of the image forming apparatus.

BRIEF SUMMARY

In an aspect of this disclosure, a liquid distribution unit capable of eliminating the need of providing plural ink cartridges of the same color ink in an ink-jet recording apparatus is provided that achieves high-definition image formation by feeding the inks of the same color to plural recording heads. Thereby, confusion of the user is eliminated and the running cost for the image formation is lowered.

In another aspect of this disclosure, a liquid distribution unit for use between a container of a liquid and an apparatus supplied with said liquid, said liquid distribution unit comprising:

a hollow body;

a single inlet port provided in said hollow body for connection to said container, said hollow body being supplied with said liquid from said container via said single inlet port; and two or more outlet ports provided in said hollow body for feeding said liquid out from said hollow body.

A liquid distribution unit, in an exemplary embodiment, can eliminate the need of providing plural ink cartridges of the same color in an image forming apparatus such as an ink-jet recording apparatus in which the ink of the same color such as a black color is supplied to plural recording heads separately for high-definition recording. Thereby, the cost of the image forming apparatus is reduced together with the chance that of the user of the image recording apparatus is get confused with the use of plural ink cartridges of the same color in the image forming apparatus.

DETAILED DESCRIPTION OF EXEMPLARY EMBODIMENTS

First Embodiment

Figure 1:
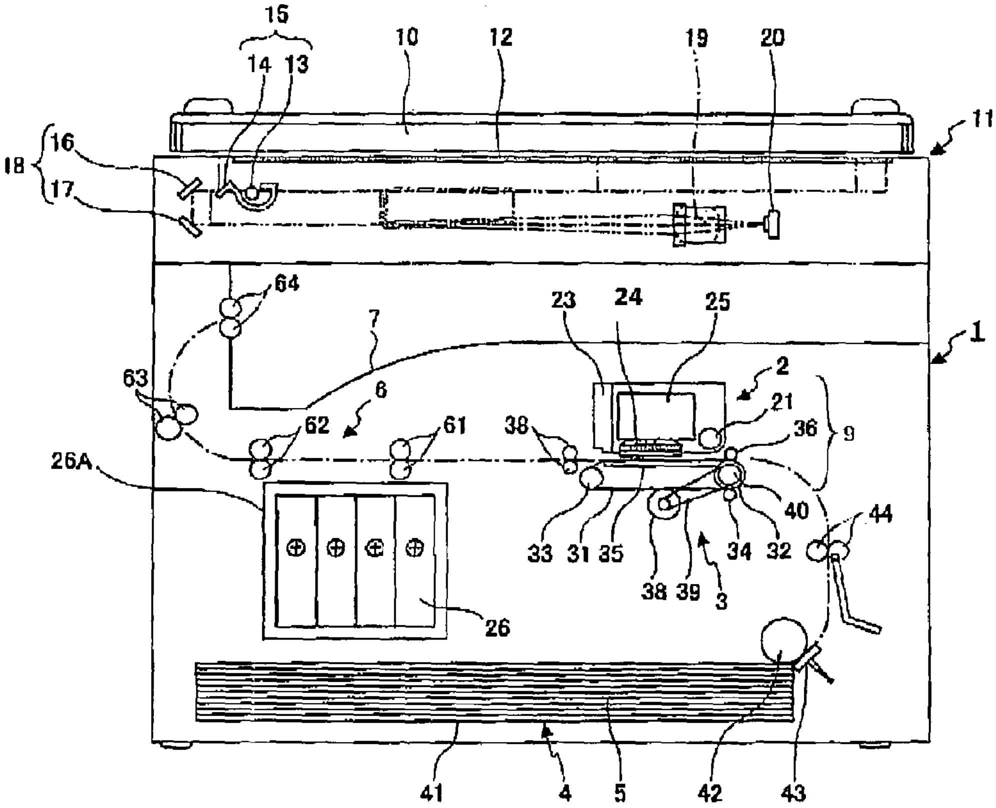
FIG. 1 is a schematic cross-sectional diagram showing the overall construction of an image forming apparatus that uses a liquid distribution unit according to the present invention.
Figure 2:
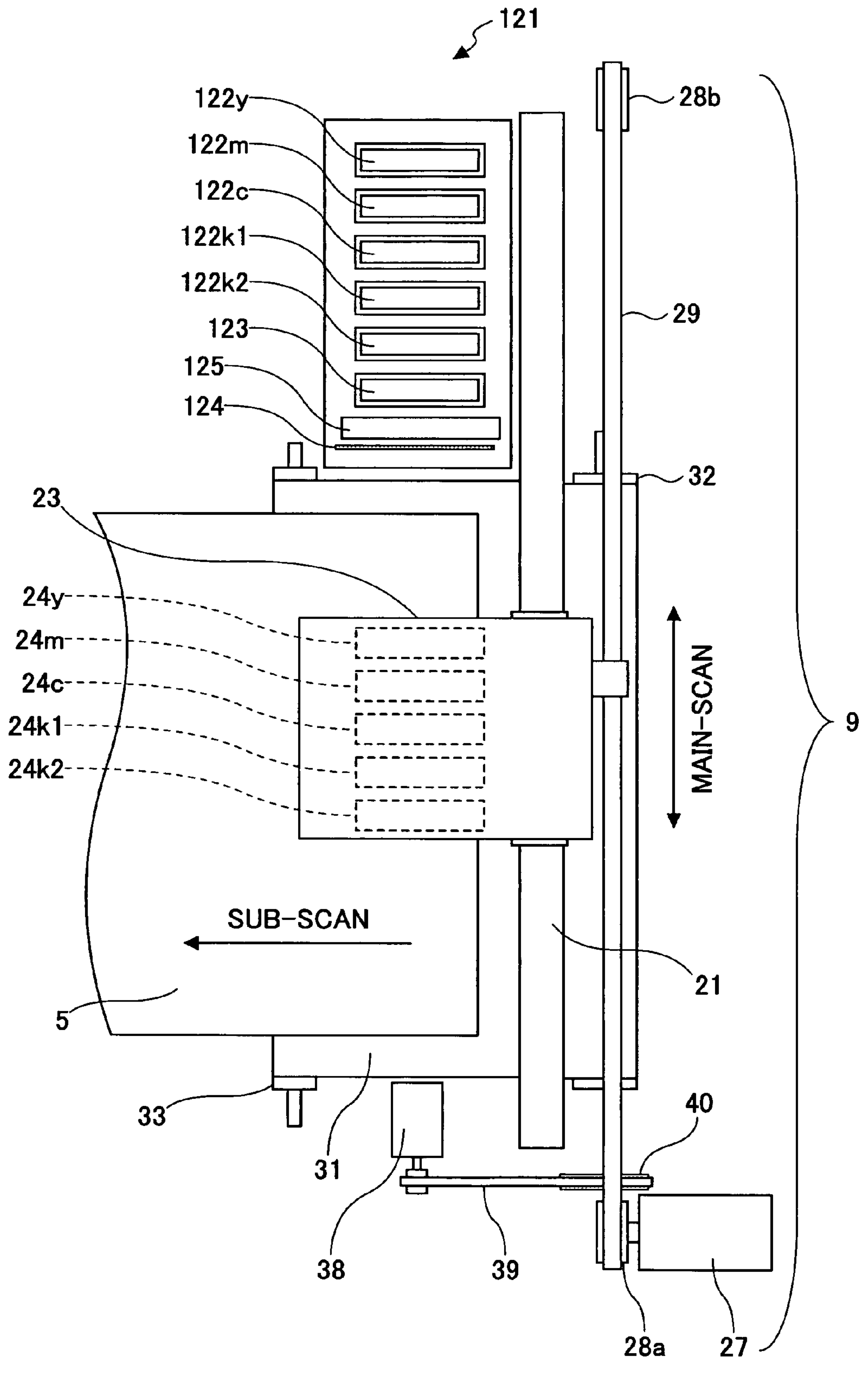
FIG. 2 is a plan view diagram showing an image forming part of the image forming apparatus of FIG. 1 schematically.

FIG. 1 is a diagram showing the overall construction of an image forming apparatus that uses the liquid distribution unit according to the present invention, while FIG. 2 shows the construction of the image forming part of the apparatus of FIG. 2 in a plan view.

Referring to FIGS. 1 and 2, the image forming apparatus includes: a sheet holder cassette 41 located at a bottom part of a main body 1 of the image forming apparatus as a sheet feeding part 4, the sheet holder cassette 41 holding therein recording sheets 5 in the form of a stack; a sheet feed mechanism including a take-up roller 42 and a friction pad 43, the take-up roller 42 engaging with an uppermost sheet 5 in the sheet stack and transporting the same one by one along a predetermined sheet feed path to a sub-scanning feed control part 3; the sub-scanning feed control part 3 including a guide plate 35 for guiding the sheet 5 supplied thereto by the sheet feed mechanism and an electrostatic timing belt 31 spanned between a pair of rollers 32 and 33, the electrostatic timing belt 31 being charged by a charging roller 34 and holding the sheet 5 electrostatically, the sheet 5 being transported along the guide plate 35 with controlled timing for achieving the vertical scanning called also sub-scanning, the roller 32 being driven thereby by a drive motor 38 via a belt 39 and a pulley 40 connected to the roller 32; an image forming part 2 including an ink-jet recording head 24 held on a carriage 23 together with a sub-tank 25 connected with the ink-jet recording head 24, the ink-jet recording head 24 being moved in a main scanning direction by the carriage 23 and forming an ink image upon the surface of the sheet 5 transported along the guide plate 35 by the electrostatic timing belt 31, by ejecting ink droplets thereto, the carriage 23 being moved along a guide 21 by a belt 29 spanned between pulleys 28*a* and 28*b* and driven by a motor 27; and a sheet discharging mechanism 6 including roller pairs 38, 61, 62, 63 and 64, the sheet discharging mechanism 6 taking up the sheet formed with the image by the image forming part 2 by the roller pair 38 and discharging the same to a discharge tray 7 at the middle part of the main body 1.

Further, the image forming apparatus of FIG. 1 is a multi-functional apparatus and thus includes a scanning part 11 at the top part of the main body 1 over the discharge tray 7, wherein the scanning part 11 is formed of a first scanning optical system 15 including an illuminating optical source 13 and a mirror 14 and a second scanning optical system 18 includes mirrors 16 and 17.

Thereby, the first scanning optical system 15 and the second scanning optical system 18 are moved to scan over a manuscript placed on a contact glass 12, and the image of the manuscript thus scanned is read by an image sensor 20 disposed behind a lens 19.

The image signal thus produced by the image sensor 20 is then digitized and applied with image processing to form printing data, and the image of the manuscript is recorded on the recording sheet 5 by the image recording part 2 according to the printing data thus obtained.

Further, there is provided a pressure plate 10 for urging the manuscript to the contact glass 12.

Further, the image forming apparatus of FIGS. 1 and 2 may be provided with printing data including image data from an external input system via a cable or network, wherein such an external input system typically includes: external information processing apparatuses such as a personal computer; external image scanning apparatuses such as an image scanner; and external image capturing apparatuses such as a digital camera, or the like. Because the construction for printing such print data received from external source is known, further explanation thereof will be omitted.

Referring to FIG. 2, the recording head 24 ejecting liquid droplets of plural different colors is mounted upon the carriage 23, wherein the carriage 23 is moved in a main-scanning direction perpendicular to the moving direction of the sheet 5 along a carriage guide 21. Thus, image formation is achieved by ejecting the liquid droplets from the recording head while feeding the sheet 5 in the sub-scanning direction and while moving the carriage 23 back and forth in the main scanning direction.

Figure 3:
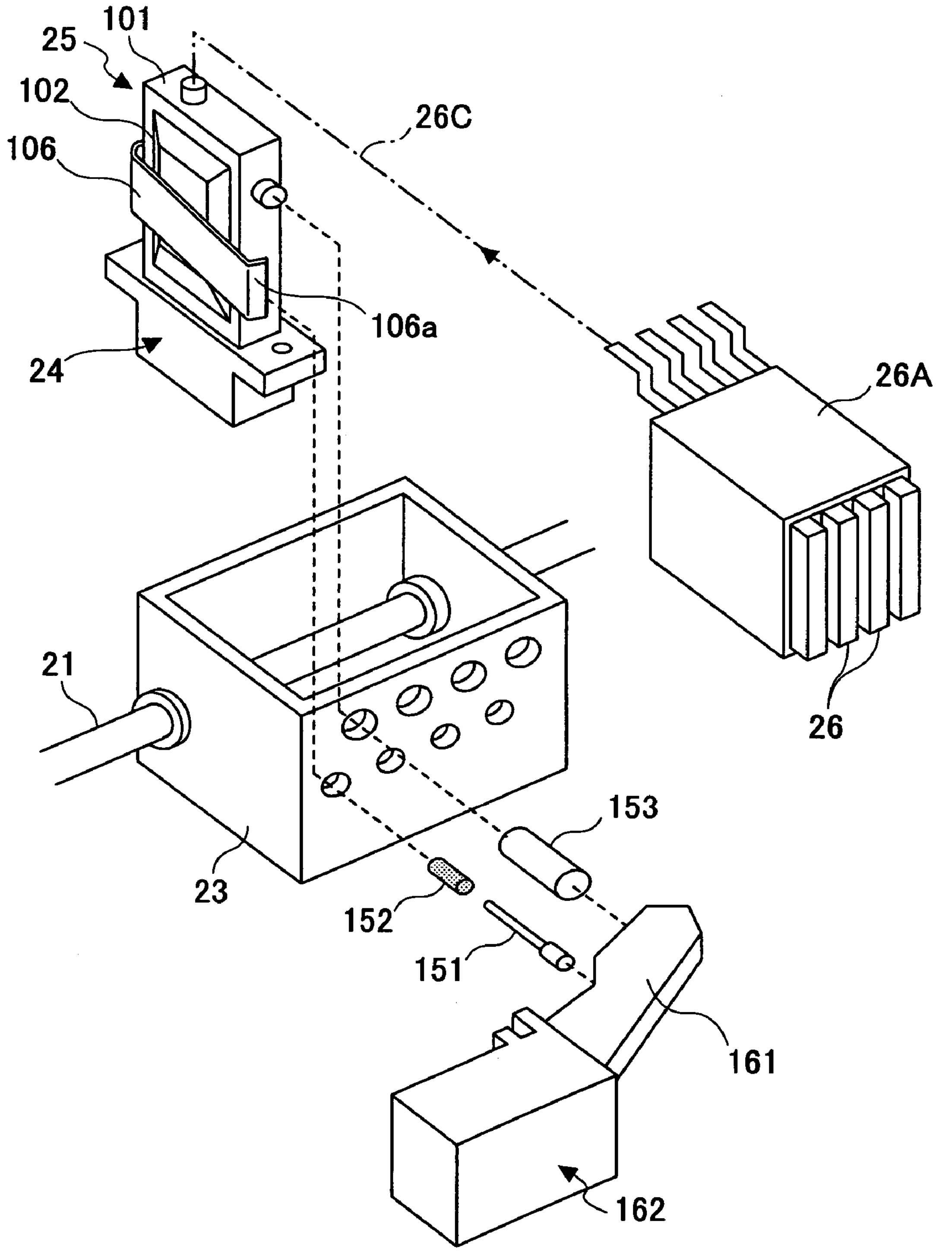
FIG. 3 is an oblique view diagram showing the connection of a recording head on a carriage and a main tank held in the apparatus of FIG. 1.
Figure 4:
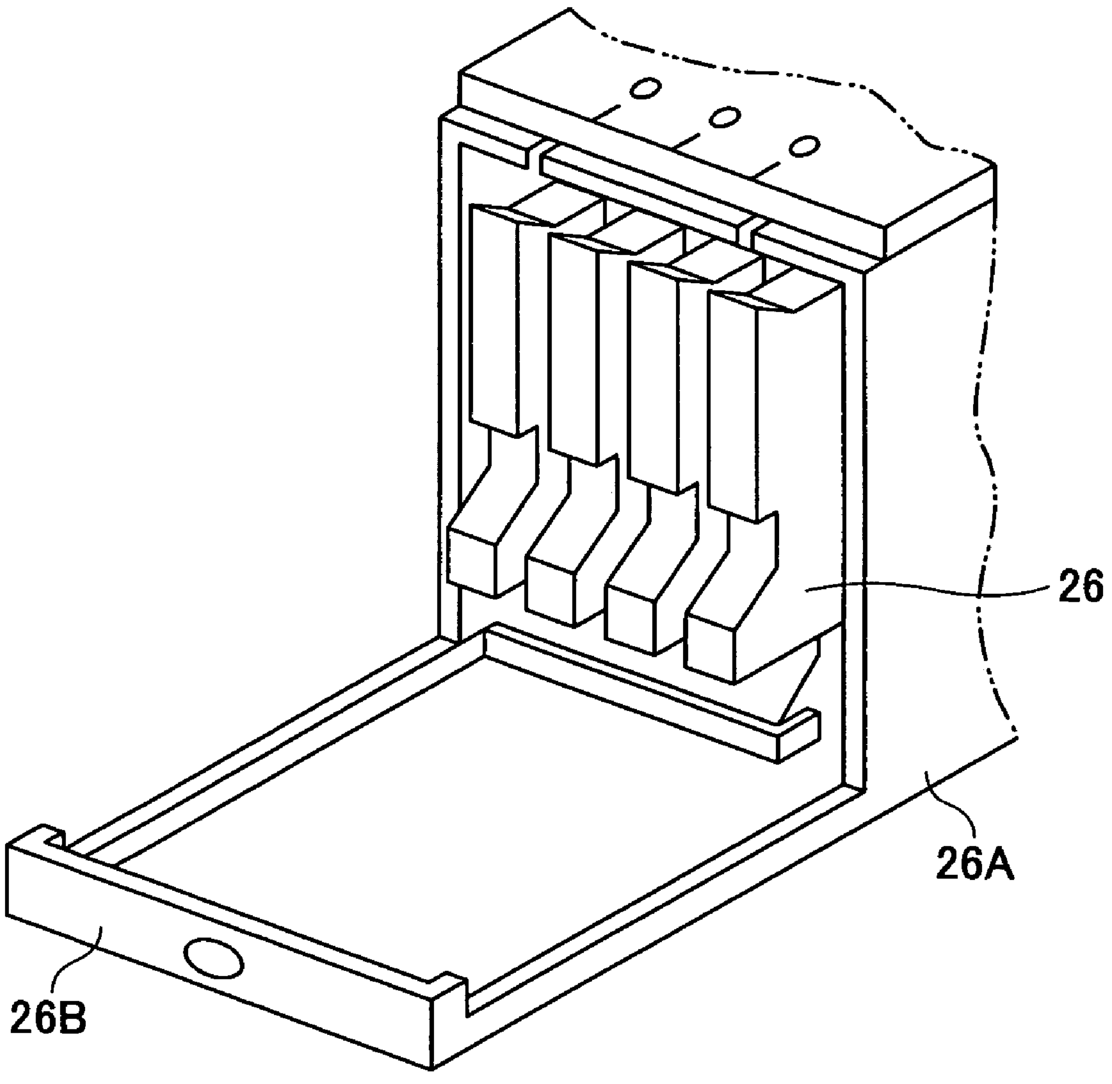
FIG. 4 is an oblique view diagram showing the structure of the main tank at a front side thereof.

Thereby, it should be noted that the recording head 24 includes: liquid ejection heads 24*k*1 and 24*k*2 ejecting the droplets of a black color (Bk); a liquid ejection head 24*c* ejecting the droplets of a cyan color (C); a liquid ejection head 24*m* ejecting the droplets of a magenta color (M); and a liquid ejection head 24*y* ejecting the droplets of a yellow color (Y), wherein the inks of the respective colors are supplied to the respective recording heads form respective sub-tanks 25 (in the interest of clarity, only one of the sub-tanks 25 is shown in FIG. 3) mounted also on the carriage 23. Thereby, it should be noted that the ejection heads 24*k*1 and 24*k*2 for the black color are disposed adjacent with each other.

Further, each of the sub-tanks is fed with an ink of the corresponding color from an ink cartridge (main tank) 26 disposed detachably in the main body 1 of the image forming apparatus at a fixed location as shown in FIG. 1 by way of a tube. While such a construction requires liquid feeding apparatus, the construction thereof is known and the description will be omitted.

For the liquid ejection head constituting the recording head 24, it is possible to use a piezoelectric head that causes ejection of the ink droplets by using a piezoelectric element as the actuator means such that the piezoelectric element pressurizes the ink in an ink passage formed in the head when ejecting the ink droplets by causing deformation in a vibration plate constituting a wall of the ink flow passage such that there is caused a change of volume of the ink flow passage. Alternatively, it is possible to use a thermal head that ejects the ink droplets by the pressure of a bubble formed in the ink in the ink passage by of heating the ink by a resistance heater. Further, it is also possible to use an electrostatic head that causes ejection of the ink droplets by providing an electrode in the vicinity of the vibration plate defining the wall surface of the ink passage and by causing deformation in the vibration plate by way of the electrostatic force induced between the vibration plate and the electrode.

In FIG. 2, it can be also seen that there is provided a maintenance unit 121 in a non-printing region provided at one end of the carriage scanning direction for maintaining and recovering the nozzle state of the recording head 24, wherein it will be noted that this maintenance unit 121 includes cap members 122*k*1, 122*k*2, 122*c*, 122*m* and 122*y* for capping the nozzles of the ejection heads 24*k*1, 24*k*2, 24*c*, 24*m* and 24*y*, respectively. Further, there are provided a wiper blade 125 for wiping the nozzle surface and a dummy region 124 where dummy ejection of the ink droplets is to be made.

Further, while the image forming apparatus of FIGS. 1 and 2 uses the electrostatic timing belt 31 for feeding the sheet 5 in the sub-scanning direction, it is also possible to achieve the control of sheet feeding in the sub-scanning direction by way of using rollers alone.

In the image forming apparatus of FIGS. 1 and 2, it should be noted that the image forming part 2 and the sub-scanning part 3 form, together with the maintenance unit 121, a detachable printing unit 9 detachable with respect to the main body 1 of the image forming apparatus. With this, maintenance of the image forming apparatus is facilitated substantially.

In the construction of FIGS. 1 and 2, it should be noted that the ink cartridge 26 is held on a cartridge holder 26A provided in the main body 1 of the image forming apparatus. With such a construction, it is preferable that the cartridge holder 26A is integrated also with the foregoing printing unit 9 such that, when the printing unit 9 is removed from the main body 1 of the image forming apparatus, the ink cartridge 26 on the holder 26A is also taken out from the main body 1. With such a construction, it becomes possible to eliminate the process of disconnecting the tube used for feeding the ink from the ink cartridge 26 to the sub-tank 25 of the image forming part 2 when the unit 9 is removed from the main body 1 of the image forming apparatus. It should be noted that such disconnection has to be made by the user of the image forming apparatus by hand, while such a manual process conducted inside the main body 1 deteriorates the easiness of maintenance and increases the risk that the ink in the tube is spilled inside the main body 1 of the image forming apparatus at the time of such an operation.

FIG. 3 shows the construction of the carriage 23 together with the connection of the carriage 23 with the main ink tank 26 held in the holder 26A.

Referring to FIG. 3, the holder 26A of the ink cartridge 26 comprises a box-shaped body holding herein plural ink cartridges 26 and includes a cover 26B capable of being opened and closed for mounting and dismounting of the ink cartridges 26. In FIG. 3, the illustration of the front cover 26B is omitted for the sake of simplicity. Further, the sub-tank 25 held on the carriage 23 is supplied with the ink from the ink cartridge 26 via an ink feeding tube 26C.

It should be noted that the sub-tank 25 has a construction of attaching a flexible film 102 on a frame 101 defining the body of the sub-tank 25 by way of bonding or welding, and includes a spring (not shown) between the frame 101 and the film 102 such that the spring urges the flexible film 102 in an outward direction. Further, there is provided a reinforcement part (not shown) on the film 102 in correspondence to the outward bulging caused by the spring, and there is further provided a pressurizing lever 106 on the lateral side of the frame 101 for pressurizing the film 102 against the exerting force of the spring in a manner movable forward and backward with regard to the film 102 such that the sub-tank 25 is squeezed when the lever 106 is actuated.

Further, as shown in FIG. 3, the carriage 23 is provided with a pin 151 via a return spring 152 so as to engage a part 106*a* of the lever 106, wherein the lever 106 squeezes the sub-tank 25 when the pin 151 is pressed down against the return action of the spring 152. Further, there is provided a vent pin 153 for venting the interior of the sub-tank 25.

Thus, by pressing down the pin 151 in the state that the interior of the sub-tank 25 is opened to the air via the vent pin 153 and further by returning the pin 151 to the initial position, the sub-tank 25 is squeezed by the lever 106 and subsequently inflated by the action of the spring inside the tank 25. Thereby, there is formed a negative pressure inside the sub-tank 25 and the ink inside the ink cartridge 26 is drawn into the sub-tank 25 via the tube 26C with the negative pressure thus formed. In order to actuate the vent pin 153, there is provided a drive unit 162 having an actuation lever 161.

Figure 5:
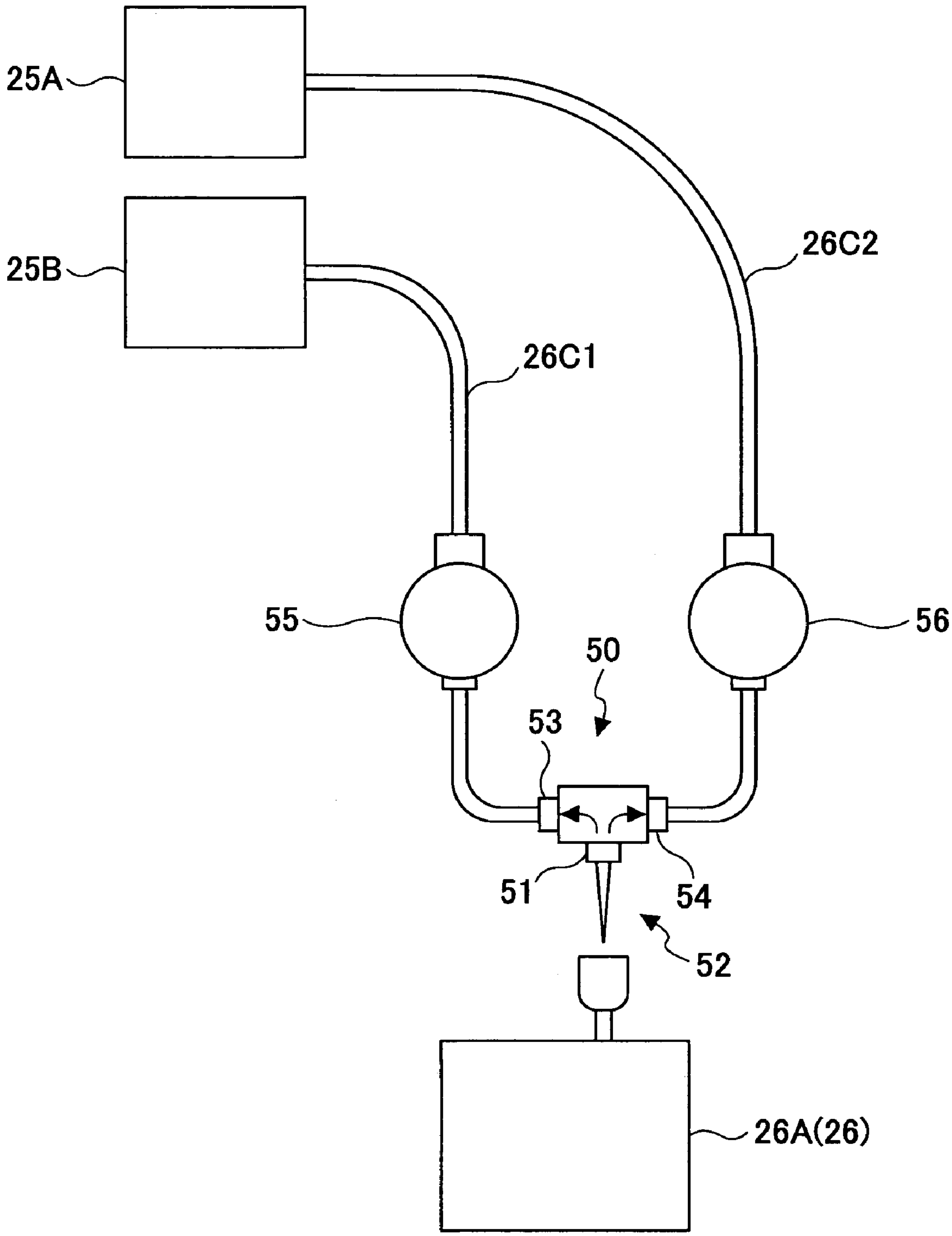
FIG. 5 is a diagram schematically showing an ink feeding system of the image forming apparatus of FIG. 1 that uses the liquid distribution unit of the present invention.

FIG. 5 is a diagram schematically showing the ink feeding system of the image forming apparatus of FIGS. 1-4 that uses a liquid distribution unit 50 according to the present invention.

Referring to FIG. 5, the liquid distribution unit 50 has an inlet port 51 provided with an ink suction tool 52 for connection to the ink cartridge 26 in the holder 26A, which may be an ink cartridge for the black color ink, wherein the ink in the ink cartridge 26 is drawn out by the tool 52 and is branched in the liquid distribution unit 50 to a first outlet port 53 and a second outlet port 54. Thereby, pumps 55 and 56 are coupled respectively to the outlet ports 53 and 54, and the ink exited from the outlet port 53 is supplied to the sub-tank 25B by the pump 56 via an ink feeding tube 26C1, while the ink exited from the outlet port 54 is supplied to the sub-tank 25A by the pump 55 via an ink feeding tube 26C2.

Figure 6:
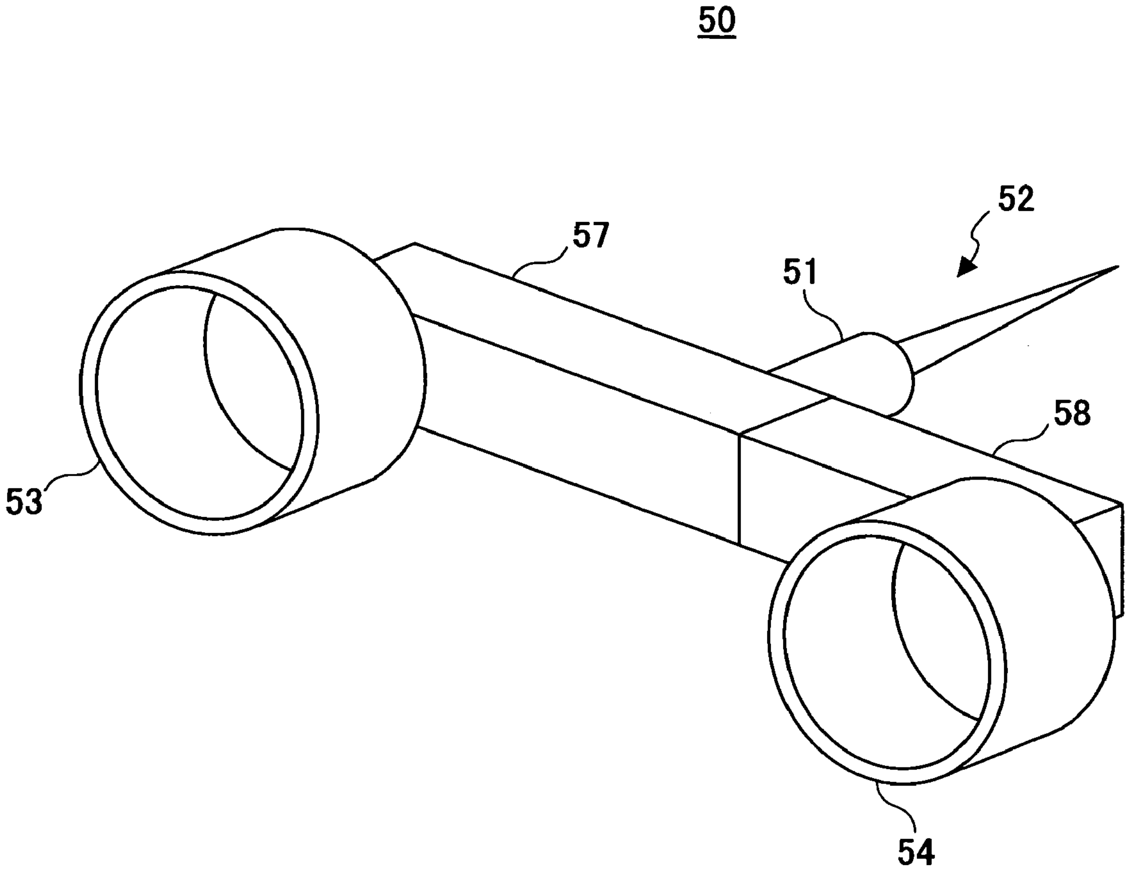
FIG. 6 is an enlarged oblique view diagram showing the liquid distribution unit according to a first embodiment of the present invention in detail.
Figure 7:
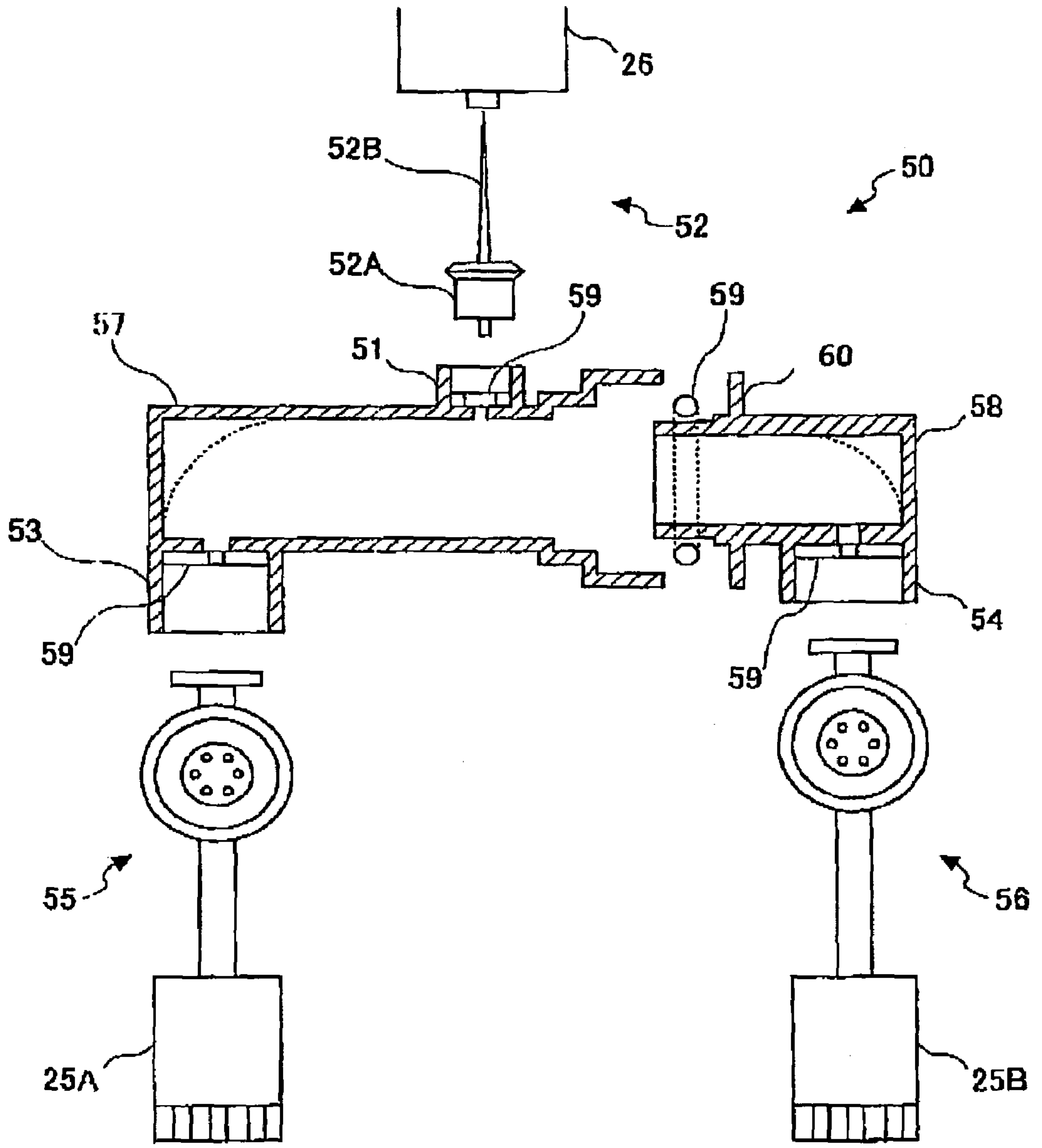
FIG. 7 is a cross-sectional diagram showing the liquid distribution unit of FIG. 6 in an exploded view.

FIG. 6 is an oblique enlarged view showing the liquid distribution unit 50 schematically, while FIG. 7 is an exploded cross-sectional view of the same liquid distribution unit 50.

Referring to the drawings, the liquid distribution unit 50 has a construction of engaging a first body part 57 and a second body part 58 of a tubular shape having a rectangular cross section and made of a material such as POM (polyacetal) or PBT (polybutylene terephthalate) in view of contact with the ink, wherein each of the first body part 57 and the second body part 58 has an opened end and the liquid distribution unit 50 is constructed by engaging the respective opened ends of the first and second body parts 57 and 58 with each other.

In an example, each of the first and second body parts 57 and 58 has an inner diameter of 2-3 mm and has a wall thickness of 1.3-1.5 mm. When the wall thickness is smaller than the foregoing, there is possibility that the pressure or water content of the ink may be lost by leak. In such a case, the composition or viscosity of the ink has to be optimized.

In the case of using a silicone tube, there is a possibility that the pressure or water content of the ink may be lost by causing leak when the image forming apparatus is left unused. While it is possible to use metals for the body parts 57 and 58, there is a possibility that working is difficult, and it is more preferable to use a resin which is easy to be molded. Further, the first and second body parts 57 and 58 may have a tubular shape of circular cross-section.

Referring to FIG. 7, the first body part 57 includes the inlet port 51 for connection to the ink cartridge 26 and the outlet port 53 for connection to the pump 55, wherein it will be noted that there is provided a seal ring 19 in each of the inlet port 51 and the outlet port 53. Thereby, the cross-sectional area of the input port 51 and the output port 53 may be determined according to the specification of the ink that is to be used for image formation.

Further, it is preferable to shape the inner wall surface of the first body part 57 to have a smooth curved surface at the closed end part thereof as shown in FIG. 7 by a dotted line, for avoiding occurrence of turbulence in the ink flow inside the liquid distribution unit 50.

On the other hand, the second body part 58 is provided with an outlet port 54 for connection to the pump 56, wherein it will be noted that a similar seal ring 59 is provided to the outlet port 54.

Again, the cross-sectional area of the outlet port 54 and the seal 59 may be determined according to the specification of the ink that is to be used. Further, it is preferable to shape the inner wall surface of the second body 58 to have a smooth curved surface at the closed end part thereof as shown in FIG. 7 by a dotted line, for avoiding occurrence of turbulence in the ink flow inside the liquid distribution unit 50, similarly to the case of the first body part 57.

In the present embodiment, the respective opened ends of the first and second body parts 57 and 58 are formed to have a structure so as to mate with each other.

Thus, the opened end of the first body part 57 has a diameter slightly larger than the diameter of the opened end of the second body part 58 such that the opened end of the second body part 58 can be inserted into the first body part 57, wherein the second body part 58 thus inserted into the first body part 57 carries thereon a seal ring similar to the seal ring 59. Thereby, the seal ring is held between the first body part 57 and the second body part 58 inserted into the first body part 57.

As a result of increase of the diameter at the opened end of the first body part 57, there is formed a stepped structure in the first body part 57 between the region of increased diameter where the opened end of the second body part 58 is inserted and the rest of the first body part 57, while the second body part 58 carries thereon a flange part 60 for engaging with the edge of the opened end of the first body part 57. Thus, the positioning of the second body part 58 is achieved with respect to the first body part 57 by merely engaging the flange part 60 with the edge of the opened end of the first body part 57 when assembling the first and second body parts 57 and 58 with each other.

In the state that the first body part 57 and the second body part 58 are assembled with each other, it should be noted that the outlet ports 53 and 54 are separated from each other by a distance of about 28 mm as measured between the centers of these outlet ports, wherein each of the outlet ports 53 and 54 has a diameter of about 10 mm.

While FIGS. 6 and 7 are illustrated as if the size of the outlet port 53 is different from the size of the outlet port 54, this discrepancy is merely for the purpose of illustration, and it is possible to determine the size and structure of the outlet ports 53 and 54 in view of the size of the pumps 55 and 56 to be explained below. Thus, the size and structure of the outlet ports 53 and 54 are by no means limited to those shown in FIGS. 6 and 7.

By providing the outlet ports 53 and 54 at the side opposite to the side where the inlet port 51 is provided as shown in FIG. 6 and 7, there is no need of providing a space inside the body 1 of the image forming apparatus for bending the ink passage from the outlet port 53 or 54 to the sub-tank 25A or 25B or for providing the pumps 55 and 56 at the lateral sides of the liquid distribution unit 50, and the liquid distribution unit 50 of the present invention can be used conveniently in compact image forming apparatus where the free space available inside the main body 1 of the image forming apparatus is limited.

With regard to the ink suction tool 52, a part that is used for an ink-jet recording apparatus can be used. In the illustrated example, the ink-drawing tool 52 comprises a fitting part 52A for fitting to the inlet opening 51 of the liquid distribution unit 50 and a hollow needle 52B having a diameter of about 1 mm and attached to the fitting part 52A.

Further, it is preferable that, in the state that the first and second body parts 57 and 58 are assembled, the volume in the liquid distribution unit 50 at a first side of the inlet port 51 is generally identical with the volume at a second, opposite side of the inlet port 51. By doing so, the time for sucking out the ink from the distribution unit 50 by the pump 55 can be set generally identical with the time for sucking out the ink by the pump 56.

Figure 8:
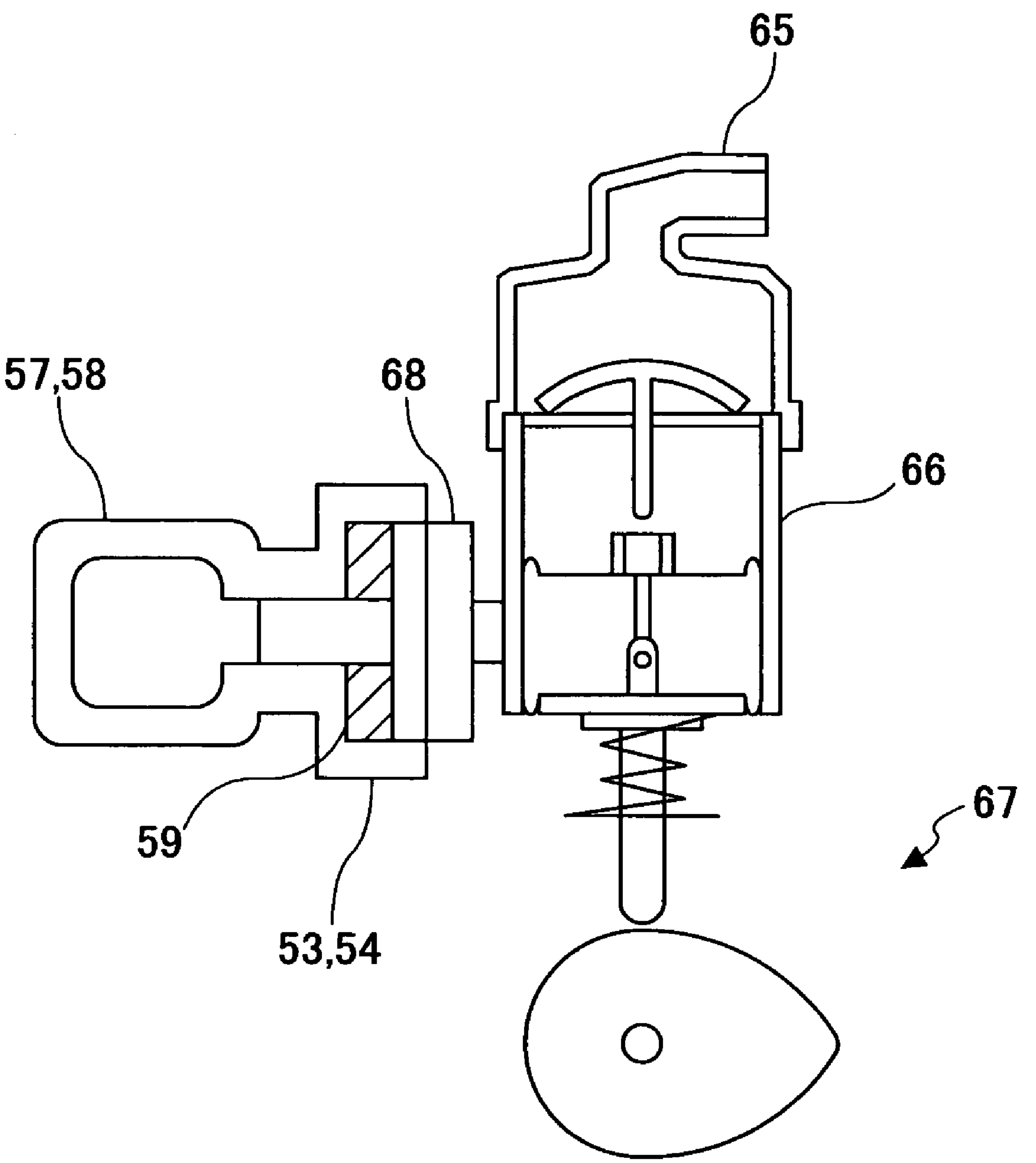
FIG. 8 is a cross-sectional diagram showing the construction of a pump unit.

FIG. 8 shows the structure of the pumps 55 and 56 in a cross-sectional view.

Referring to FIG. 8, each of the pumps comprises a connection port 65 for connection to any of the sub-tanks 25A and 25B, a valve body 66 and a cam mechanism 67 (which may be the one used in the ink-jet recording apparatus), wherein the valve body 66 is formed with a connection port to the outlet ports 53 and 54 of the liquid distribution unit 50. It should be noted that any suitable known pumps can be used for the pumps 55 and 56, wherein it is preferable that the pump has a non-return valve. However, the present invention is not limited to such a particular pump construction.

Figure 9:
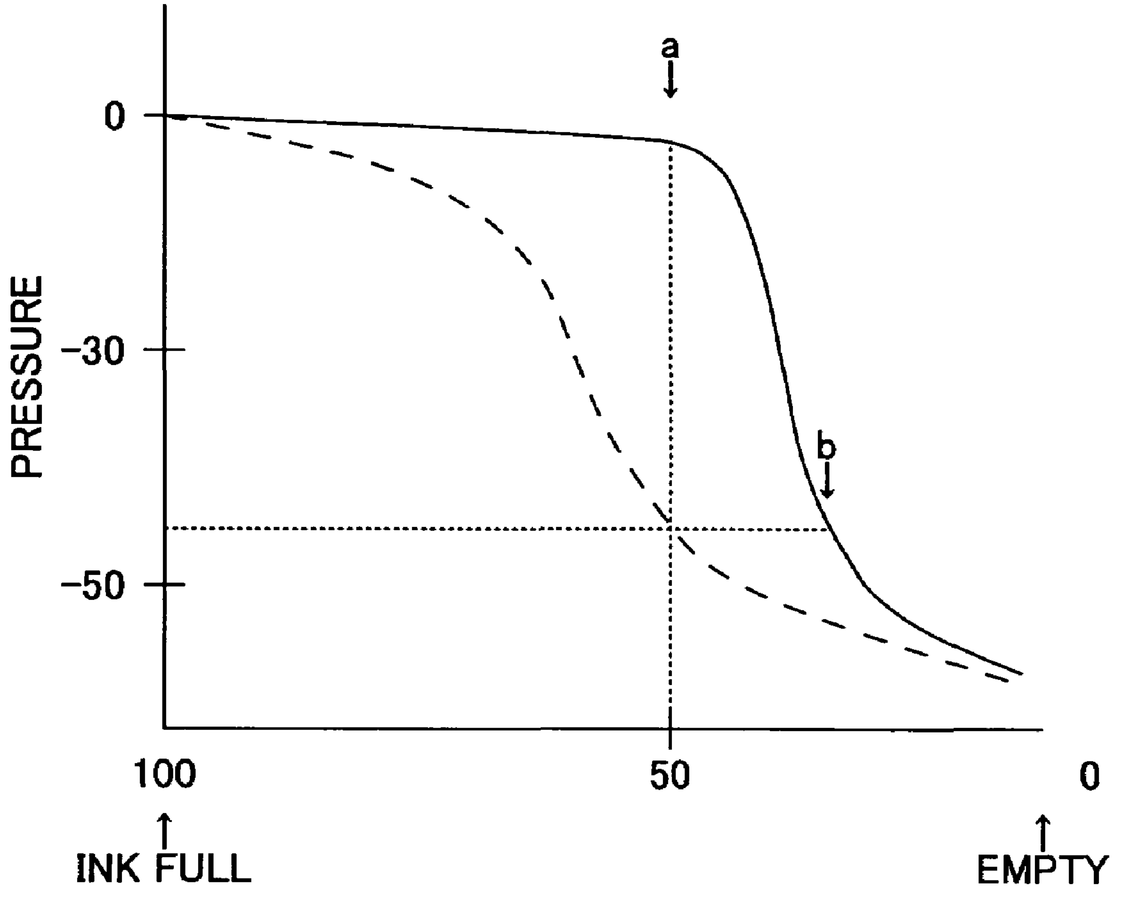
FIG. 9 is a graph comparing the performance of ink feeding of the present invention in comparison with a related art of the present invention.

FIG. 9 compares the performance of the ink distribution unit of the present invention with a related art of the present invention proposed by the inventor of the present invention, in which a flexible bag is folded by two to form two bags for supplying the ink to respective sub-tanks, wherein the continuous line represents the relationship between the ink pressure and the amount of the ink remaining in the ink cartridge for the case of the present invention, while the broken line represents the result for the related art.

As can be seen in FIG. 9, there occurs little pressure loss in the case of the present invention until the timing a, defined for a predetermined residual ink amount, has been reached, and that a sufficient pressure is maintained up to the timing immediately before the timing b for warning insufficient ink amount to the user of the image forming apparatus.

Second Embodiment

Figure 10:
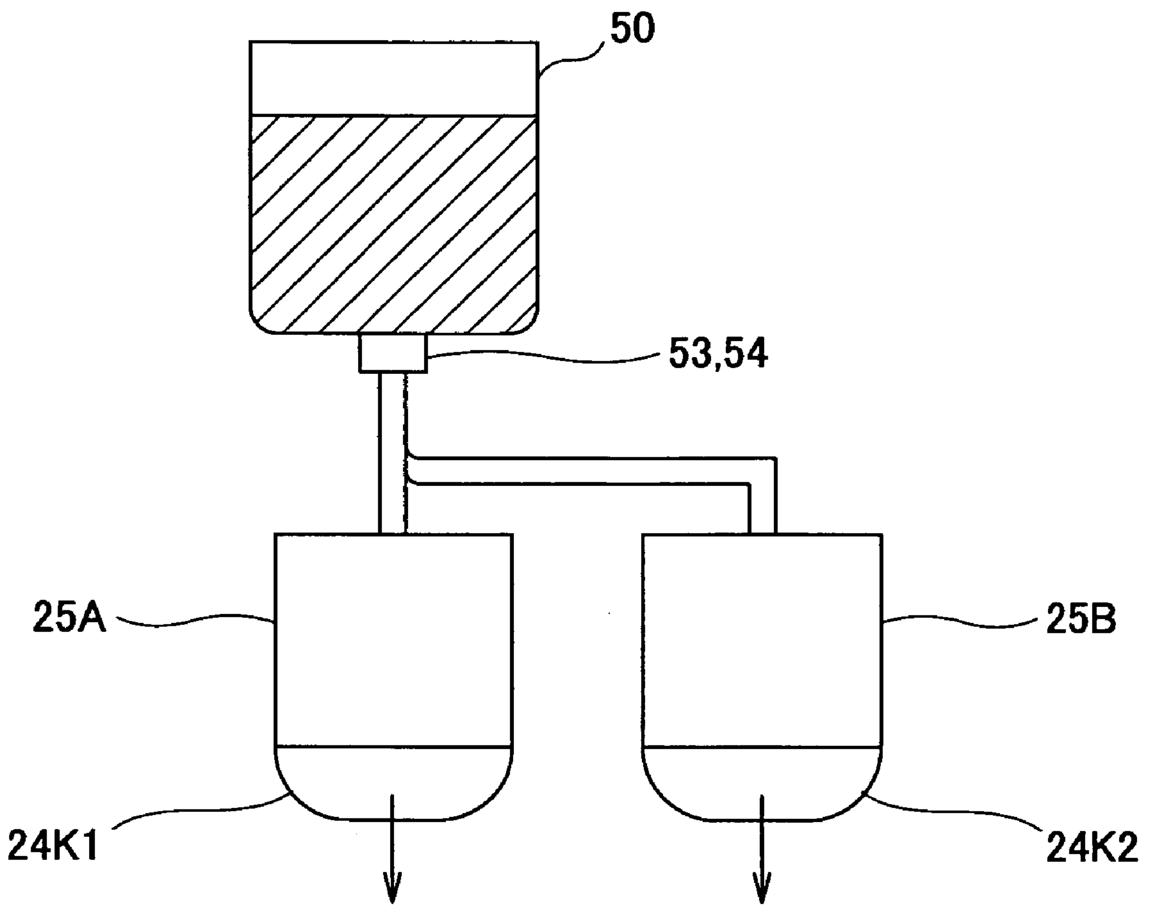
FIG. 10 is a schematic diagram showing the liquid distribution unit according to a second embodiment of the present invention.

FIG. 10 is a schematic diagram showing the construction of the liquid distribution unit according to a second embodiment of the present invention.

Referring to FIG. 10, the present embodiment does not use the pumps 55 and 56 at the outlet ports 53 and 54, contrary to the previous embodiment, and the ink is supplied directly from the ink distribution unit 50 to the sub-tanks 25A and 25B by water head difference.

Third Embodiment

Figure 11:
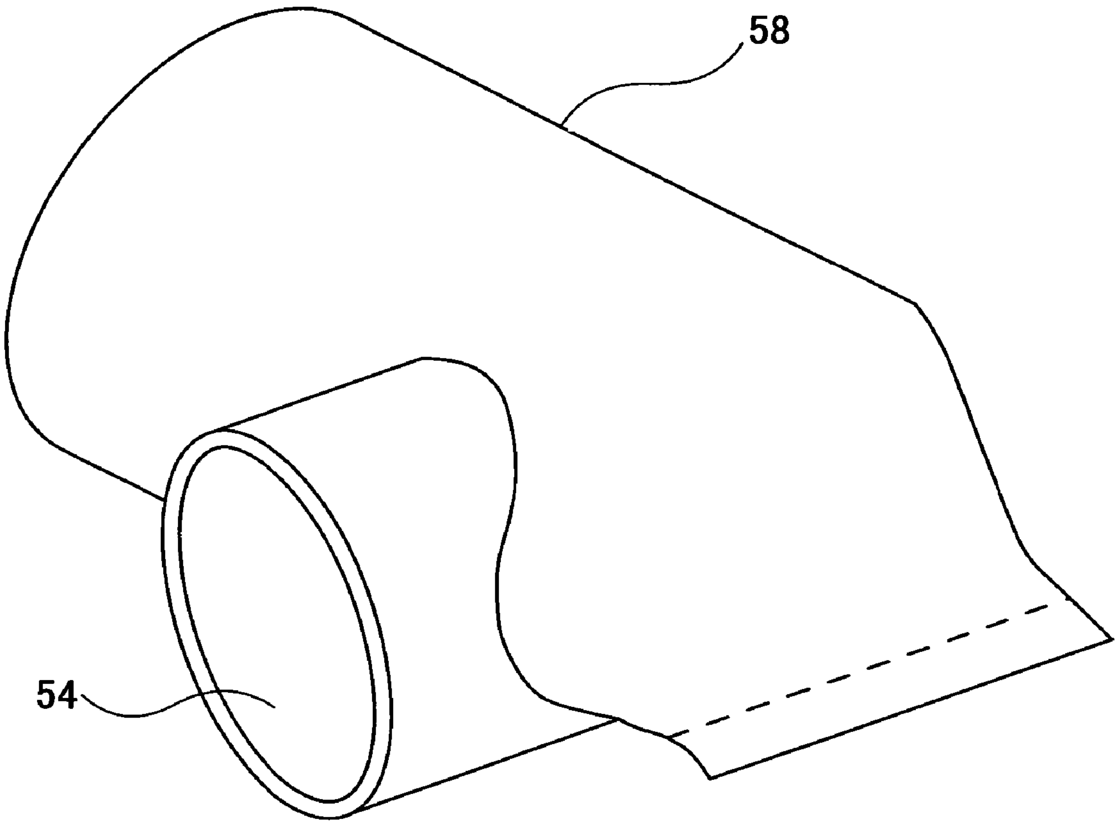
FIG. 11 is a diagram showing a third embodiment of the present invention.

Further, while not illustrated, it is possible to form at least one of the first and second body parts 57 and 58 by a cylindrical member and closing an end far from the inlet port 51 by flattening the end and applying thermal welding to such a flattened part. Thereby, the outlet port 53 or 54 is provided in the vicinity of such a closed end as shown in FIG. 11.

Such a construction is advantageous in view of low cost by forming the cylindrical member by using a resin molding process. On the other hand, such a construction has a drawback in that the flow of ink may be tabulated at the closed end part.

Further, it is possible to form the first and second parts 57 and 58 by a single tubular member and close the both end parts thereof by thermal welding. This construction, too, is advantageous in view of low manufacturing cost, while it has the drawback of occurrence of turbulence in the ink flow at such closed end parts.

Further, it is conceivable to realize the function of the liquid distribution unit of the present invention by connecting a branched flexible tube structure to the cartridge 26 in the holder 26A.

In such a case, however, there is a need of connecting the flexible tubes inside the main body 1 of the image forming apparatus manually, while such manual connection of the tubes inside the main body 1 of the image forming apparatus is becoming difficult in view of downsizing of the image forming apparatus and associated decrease of the space for carrying out such connection work inside the main body 1 of the image forming apparatus.

While the present invention has been explained for the system that uses a main tank and a sub-tank, it should be noted that the present invention is not limited to such a construction and it is possible to apply the present invention to the image forming apparatus of the type in which the ink is fed directly to the recording head. Further, the present invention can be used for a liquid supplying system other than the one used for supplying ink. Further, while the explanation has been made for the example in which the ink distribution unit is formed of two parts, it is possible to form the ink distribution unit by three or more parts.

Further, the present invention is by no means limited to the embodiments described heretofore, but various variations and modifications may be made without departing from the scope of the invention.

The present invention is based on Japanese priority application No. 2004-365325 filed on Dec. 17, 2004, which is incorporated herein as reference.

What is claimed is:

1. A liquid distribution unit for use between a container of a liquid and an apparatus supplied with said liquid, said liquid distribution unit comprising:

a hollow body;

a single inlet port provided in said hollow body for connection to said container, said hollow body being supplied with said liquid from said container via said single inlet port; and two or more outlet ports provided in said hollow body for feeding said liquid out from said hollow body, said hollow body comprising a first hollow body part having a tubular shape with a rectangular cross section and including said single inlet port and one of said outlet ports and a second hollow body part having a tubular shape with a rectangular cross section and including another of said outlet ports, an end of said first hollow body and an end of said second hollow body being opened and forming respective opened ends, said opened end of said first hollow body and said opened end of said second hollow body having respective shapes to fit with each other, said first hollow body part and said second hollow body part being assembled with each other by engaging said opened end of said first hollow body with said opened end of said second hollow body, the outlet port of said first hollow body having a seal ring therein and being adapted to be connected to a first pump unit, the outlet port of said second hollow body having a seal ring therein and being adapted to be connected to a second pump unit, and said single inlet port being provided at a sidewall of said first hollow body part and fitted with a fitting part attached with a hollow needle.

2. The liquid distribution unit as claimed in claim 1, wherein each of said outlet port is capable of being mounted with a liquid feeding unit feeding the liquid to an outside of said liquid supplier unit.

3. The liquid distribution unit as claimed in claim 1, wherein said first and second hollow body parts are formed of a material having a rigidity.

4. The liquid distribution unit as claimed in claim 1, wherein said first and second hollow body parts are formed of a flexible material.

5. The liquid distribution unit as claimed in claim 4, wherein at least one of said first and second hollow body part has a flat end part at an end away from said inlet part.

6. The liquid distribution unit as claimed in claim 1, wherein said first and second hollow body parts forming together a space inside said liquid distribution unit, a part of said space located at a first side of said inlet port having a volume generally equal to a volume of another part of said volume located at a second, opposite side of said inlet port.

7. The liquid distribution unit as claimed in claim 1, wherein the opened end of the first hollow body and the opened end of the second hollow body have complementary shapes to fit with each other.

8. An ink-jet recording apparatus, comprising:

a sheet feed mechanism feeding a sheet along a path; an ink tank holding an ink therein;

a plurality of recording heads each ejecting said ink onto said recording sheet; and an ink distribution unit distributing said ink in said ink tank to said plurality of recording heads, said ink distribution unit comprising:

a hollow body;

a single inlet port provided in said hollow body for connection to said container, said hollow body being supplied with said ink from said ink tank via said single inlet port; and two or more outlet ports provided in said hollow body for feeding said ink out from said hollow body to said plurality of recording heads;

said hollow body comprising a first hollow body part having a tubular shape with a rectangular cross section and including said single inlet port and one of said outlet ports and a second hollow body part having a tubular shape with a rectangular cross section and including another of said outlet ports, an end of said first hollow body and an end of said second hollow body being opened and forming respective opened ends, said opened end of said first hollow body and said opened end of said second hollow body having respective shapes to fit with each other, said first hollow body part and said second hollow body part being assembled with each other by engaging said opened end of first hollow body with said opened end of said second hollow body, the outlet port of said first hollow body having a seal ring therein and being adapted to be connected to a first pump unit, the outlet port of said second hollow body having a seal ring therein and being adapted to be connected to a second pump unit, and said single inlet port being provided at a sidewall of said first hollow body part and fitted with a fitting part attached with a hollow needle.

9. The ink-jet recording apparatus as claimed in claim 8, wherein said ink in said ink tank is distributed to at least two of said plurality of recording heads such that said plurality of recording heads supplied with said ink carry our image recording on said recording sheet with in identical color.

10. An image forming apparatus, comprising:

an ink jet recording apparatus, said ink-jet recording apparatus comprising:

a sheet feed mechanism feeding a sheet along a path;

an ink tank holding an ink therein;

a plurality of recording heads each ejecting said ink onto said recording sheet; and an ink distribution unit distributing said ink in said ink tank to said plurality of recording heads, said ink distribution unit comprising:

a hollow body;

a single inlet port provided in said hollow body for connection to said container, said hollow body being supplied with said ink from said ink tank via said single inlet port; and two or more outlet ports provided in said hollow body for feeding said ink out from said hollow body to said plurality of recording heads, said hollow body comprising a first hollow body part having a tubular shape with a rectangular cross section and including said single inlet port and one of said outlet ports and a second hollow body part having a tubular shape with a rectangular cross section and including another of said outlet ports, an end of said first hollow body and an end of said second hollow body being opened and forming respective opened ends, said opened end of said first hollow body and said opened end of said second hollow body having respective shapes to fit with each other, said first hollow body part and said second hollow body part being assembled with each other by engaging said opened end of said first hollow body with said opened end of said second hollow body, said outlet port of said first hollow body having a seal ring therein and being adapted to be connected to a first pump unit, the outlet port of said second hollow body having a seal ring therein and being adapted to be connected to a second pump unit, and said single inlet port being provided at a sidewall of said first hollow body part and fitted with a fitting part attached with a hollow needle.

* * * * *